United States Patent

Wise

[11] Patent Number: 5,824,995
[45] Date of Patent: Oct. 20, 1998

[54] APPARATUS FOR USE IN THE TRANSPORTATION OF FLUID MATERIALS OR PARTICULATE MATTER

[75] Inventor: John Richard Wise, Norfolk, United Kingdom

[73] Assignee: Crestbury Limited, Norfolk, United Kingdom

[21] Appl. No.: 688,766

[22] Filed: Jul. 31, 1996

[51] Int. Cl.$^6$ ............................ H05B 3/00; B60L 1/02; B65D 33/02; B65D 81/18
[52] U.S. Cl. ........................ 219/393; 219/201; 219/202; 219/213; 219/386; 220/1.5; 220/403; 392/443
[58] Field of Search .................. 219/201, 202, 219/213, 385, 386, 393; 220/1.5, 403; 222/95; 410/68; 392/443, 444

[56] References Cited

U.S. PATENT DOCUMENTS

| | | | |
|---|---|---|---|
| 2,607,879 | 8/1952 | Workman | 392/443 |
| 3,863,799 | 2/1975 | Thomaswick et al. | 220/1.5 |
| 3,903,825 | 9/1975 | Hamy | 114/77 R |
| 4,574,986 | 3/1986 | Baris et al. | 410/68 |
| 4,792,293 | 12/1988 | Hamada et al. | 220/403 |
| 4,875,596 | 10/1989 | Lohse . | |
| 5,022,108 | 6/1991 | Larson | 392/443 |
| 5,069,352 | 12/1991 | Harbolt et al. . | |
| 5,181,625 | 1/1993 | Podd et al. | 220/1.5 |
| 5,188,460 | 2/1993 | Dorse | 220/403 |
| 5,263,601 | 11/1993 | Borow | 220/1.5 |
| 5,524,781 | 6/1996 | Podd et al. | 220/1.5 |
| 5,595,315 | 1/1997 | Podd et al. | 220/1.5 |
| 5,664,678 | 9/1997 | Budowski et al. | 220/1.5 |

FOREIGN PATENT DOCUMENTS

| | | |
|---|---|---|
| 0013591 | 7/1980 | European Pat. Off. . |
| 981224 | 1/1965 | United Kingdom . |
| 1298488 | 12/1972 | United Kingdom . |
| 2067522 | 1/1981 | United Kingdom . |

*Primary Examiner*—Teresa J. Walberg
*Assistant Examiner*—J. Pelham
*Attorney, Agent, or Firm*—Tarolli, Sundheim, Covell, Tummino & Szabo

[57] ABSTRACT

Apparatus for use in the transportation of fluid materials or particulate matter Apparatus for use in the transportation of fluid materials or particulate matter in a container for use with container handling equipment, such as an ISO 20 foot container (50). The apparatus comprises body means (52) removably fittable in such a container (50) for defining a volume for containing a fluid material or particulate matter when fitted in such a container. The body means is provided with adjusting means (66) for selectively varying said volume.

13 Claims, 3 Drawing Sheets

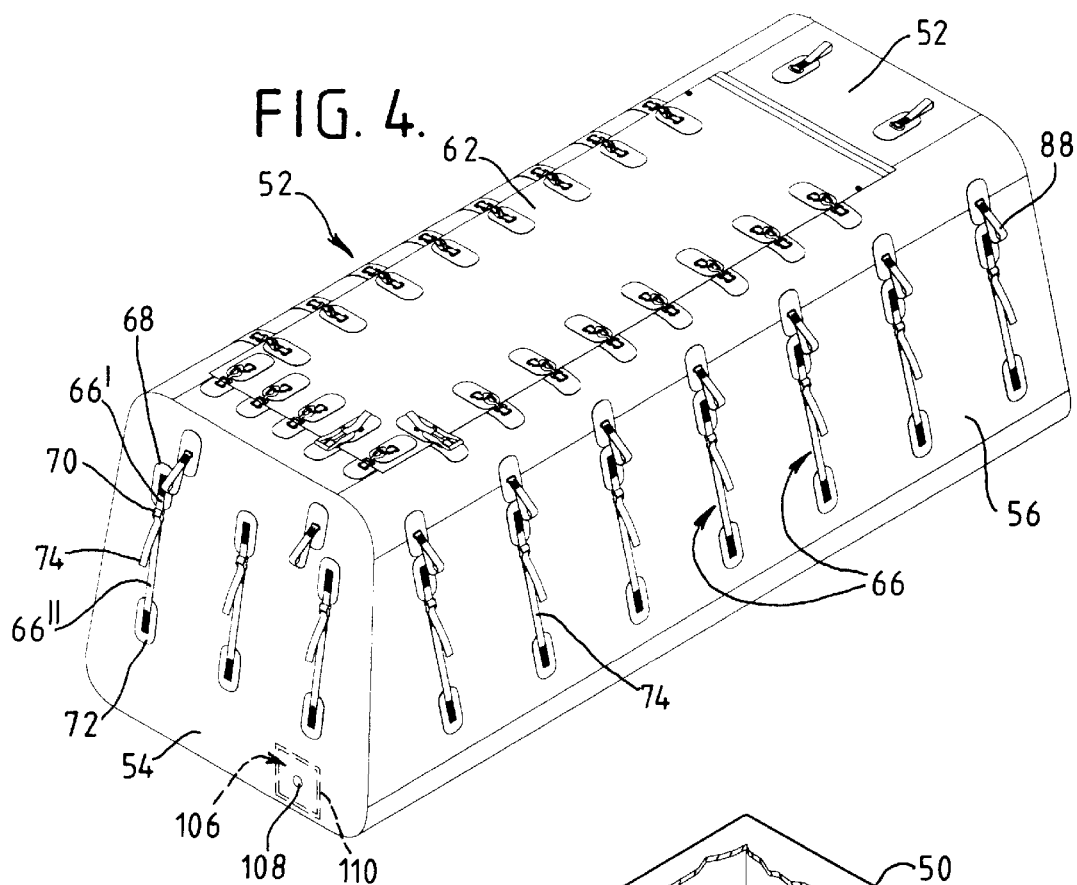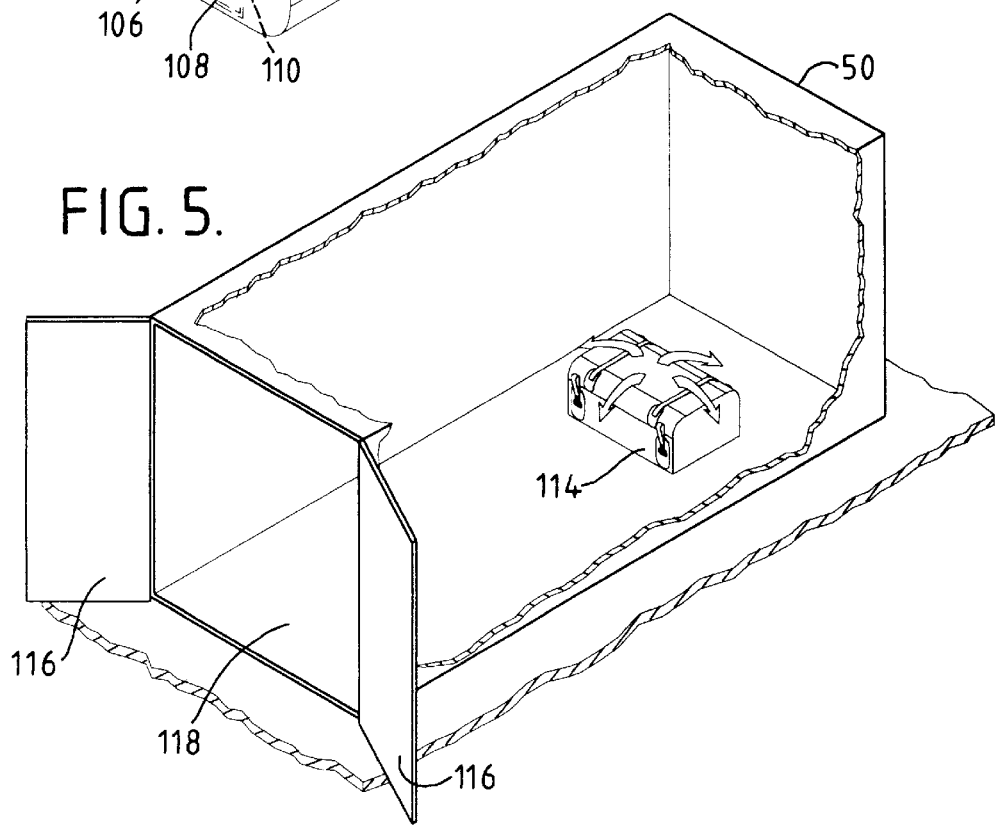

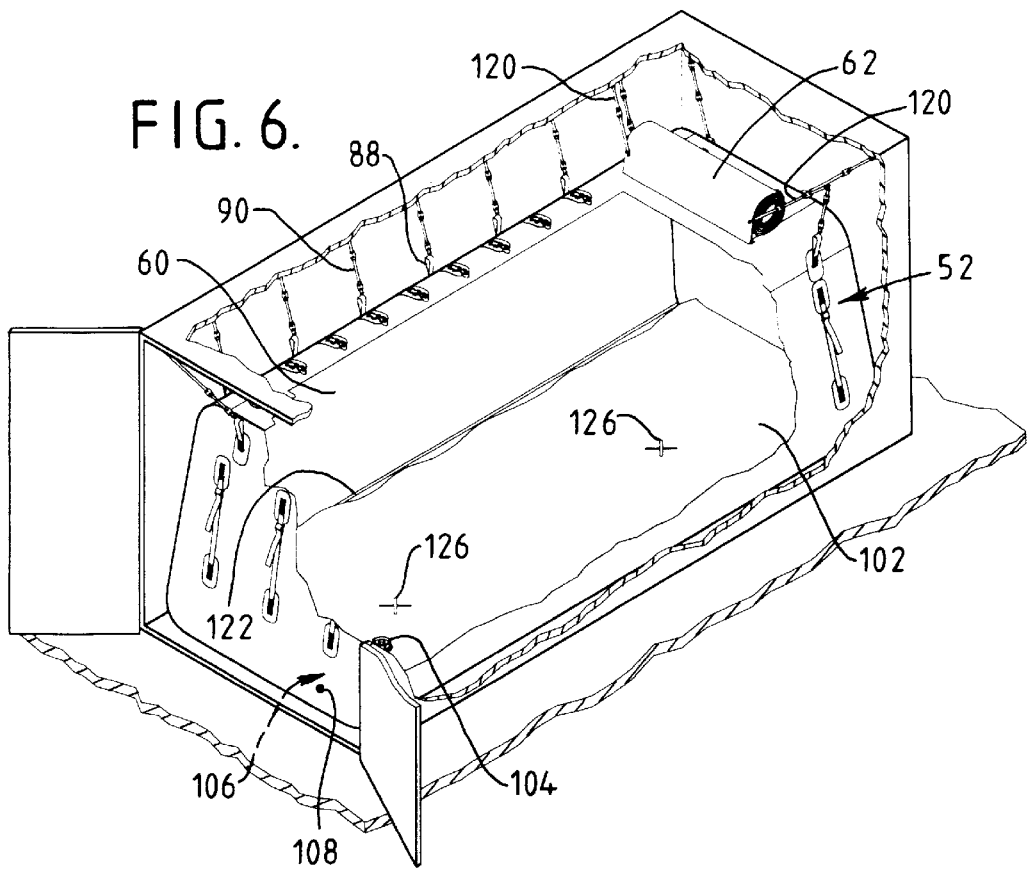
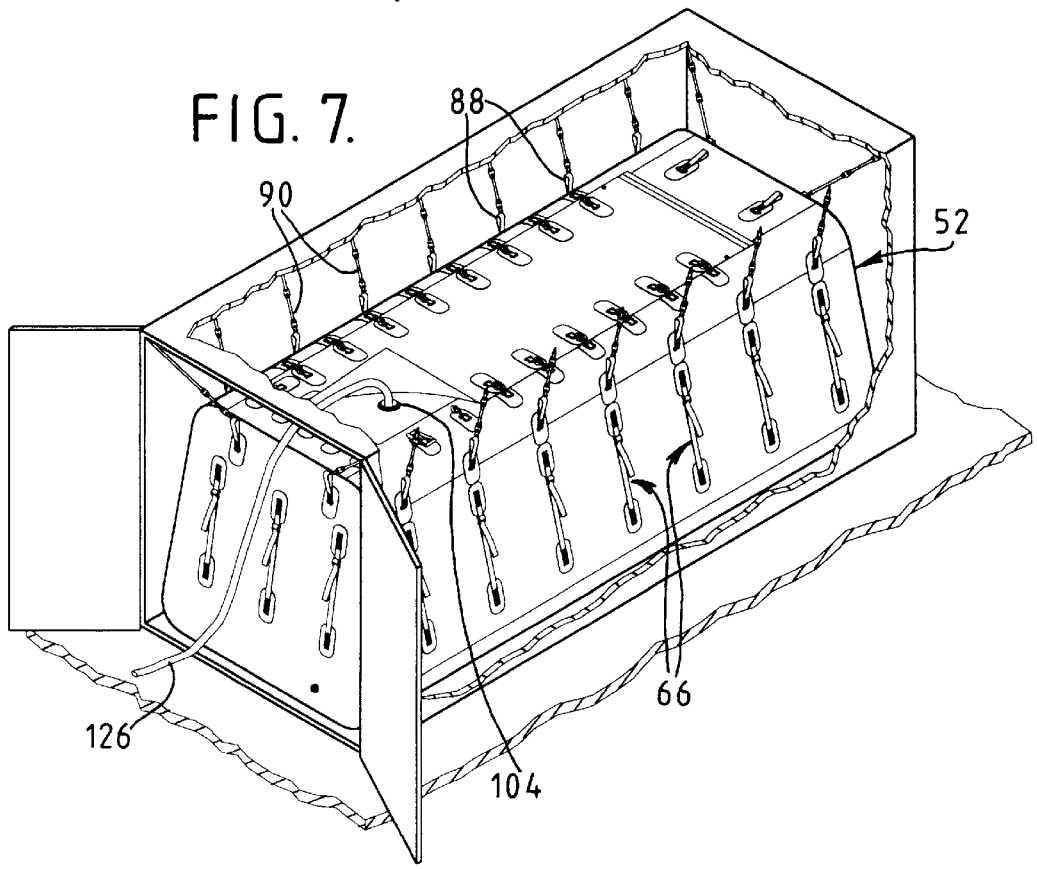

APPARATUS FOR USE IN THE TRANSPORTATION OF FLUID MATERIALS OR PARTICULATE MATTER

The invention relates to apparatus for use in the transportation of fluid material or particulate matter in containers, such as 20 foot ISO containers, for use with container handling equipment.

It is known to transport liquids in tankers which typically form part of an articulated vehicle. This method of transportation is not cost efficient if the liquid is transported over long distances and particularly if it is for export, since unless a load suitable for transport by tanker can be found for the return journey, the tanker must return empty. Furthermore, tankers must be cleaned out, particularly where a different liquid is to be transported in order to avoid contamination of the load.

The applicant has previously devised apparatus for use in the transportation of fluid materials or particulate matter in containers, such as 20 foot ISO containers, for use with container handling equipment. The apparatus which is shown in use in FIG. 1, comprises body means 10 removably fittable in such a container 12 for defining a volume for containing a fluid material, or particulate matter, when fitted in such a container. A liner for the body means is accessed via a flap 14 in the body means. The fluid material or particulate matter is contained in the liner which is in the form of a hermetically sealed bag provided with a valve or valves for the loading and discharge of the fluid material or particulate matter.

When the fluid material or particulate matter has been discharged from the liner at the point of delivery, the liner can be removed for disposal and the body means 10 can be folded down to a compact size for return with the container. Thus the container can readily be utilised for the transportation of non-fluid/particulate loads on the return journey thereby reducing the likelihood that it will have to be returned empty. Alternatively, if a fluid or particulate load is available for the return journey, a new liner can easily be fitted into the body means so that no cleaning of the container or liners is required to avoid contamination of the load.

The above described apparatus has proved very successful. However two problems exist with this apparatus. Firstly, an ISO 20 foot container can carry a maximum load of twenty tonnes. In order to be able to carry twenty tonnes of a fluid material or particulate matter in such a container, different size body means 10 and liners must be provided according to density. It will be appreciated that in order to reduce the dynamic forces set up in the fluid material or particulate matter whilst in transit, the volume defined by the body means and the liner therein must correspond closely to the volume occupied by twenty tonnes of the fluid material or particulate matter so that the fluid material or particulate matter is not free to move within the liner. Accordingly, a body means and liner sized to have a volume corresponding to 20 tonnes of water (density 998 kg/m$^3$) would not be suitable for transporting 20 tonnes of paraffin oil (density 800 kg/m$^3$).

The second problem with the known apparatus is that a bulkhead has to be provided between the body means 10 and the doors 16 of the container. This bulkhead comprises a steel gate 18 which is inserted into slots in the container adjacent the doors 16 and a sheet of plywood 20 disposed between the gate 18 and the liner. The bulkhead is provided for three reasons: firstly, if a bulkhead were not provided, as the liner is filled the body means would tend to bulge out of the container through the door space making it difficult to close the doors; secondly, the bed of the type of trailer on which such containers are usually carried typically has a five degree downward slope from front to rear. In the absence of a bulkhead, there would be a tendency for the filled body means 10 to slide out of the container under the influence of gravity; and thirdly, whilst in transit, dynamic forces are set up by movement of the fluid material or particulate matter contained in the body means particularly when a vehicle carrying the container is braked. The bulkhead prevents transmission of such dynamic forces to the container doors to avoid the possibility of their being forced open or damaged by such forces.

It is an object of the invention to at least in part overcome the above-described problems.

Accordingly, the invention provides apparatus for use in the transportation of fluid materials or particulate matter in a container for use with container handling equipment, said apparatus comprising body means removably fittable in such a container for defining a volume for containing a fluid material or particulate matter when fitted in such a container, said body means being provided with adjusting means for selectively varying said volume.

Preferably, the apparatus comprises a liner fittable in said body means and having valve means for the loading and discharging of such a fluid material or such particulate matter.

Preferably, the liner is adapted to contain a predetermined maximum volume of fluid material or particulate matter.

The apparatus may comprise a plurality of said liners, at least one said liner being adapted to contain a predetermined maximum volume of fluid material or particulate matter different to the predetermined maximum volume of the or each other said liner.

Advantageously, said body means comprises a base portion and opposed end walls and side walls at least one of which said walls, in use, extends upwardly and inwardly of said base portion.

Preferably, the adjusting means is operable for varying the upward extent of said side and end walls.

The adjusting means may comprise respective adjustable strap means fitted at least to said side walls.

Preferably, the adjusting means is calibrated.

The body means may be adapted for housing electrical heating means for selectively applying heat to fluid material or particulate matter contained therein.

The apparatus may comprise an electrical heating mat partially received in pockets defined by said body means.

The invention also includes a method of transporting a fluid material or particulate matter in a container for use with container handling equipment, the method including arranging a collapsible body means in such a container, said body means having a base portion and opposed side walls and opposed end walls for defining a volume for containing the fluid material or particulate matter to be transported, adjusting said volume of the body means to correspond substantially to the volume occupied by a predetermined mass of said fluid material or particulate matter and loading said predetermined mass of fluid material or particulate matter into said body means.

The method may include the step of fitting a liner into said body means, said liner having valve means for the loading and discharging of said fluid material or particulate matter and said fluid material or particulate matter being loaded into said liner via said valve means.

The method may include the step of selecting a said liner which is adapted to contain a maximum volume of fluid material or particulate matter corresponding substantially to said volume occupied by said predetermined mass of material.

The method may include the step of supporting said side and end walls prior to the step of adjusting said volume by strap means removably attached to walls of said container.

The method may include the step of activating electrical heating means housed in said body means for applying heat to said fluid material or particulate matter contained therein.

The invention also includes apparatus for use in the transportation of fluid materials or particulate matter in a container for use with container handling equipment, said apparatus comprising body means removably fittable in such a container for defining a volume for containing a fluid material or particulate matter and electrical heating means housed by said body means for selectively applying heat to fluid material or particulate matter contained in said body means.

In order that the invention may be well understood, an embodiment thereof, which is given by way of example only, will now be described with reference to the accompanying drawings, in which:

FIG. 4 is a perspective view of the apparatus of FIG. 2;

FIG. 5 shows the apparatus of FIG. 2 in a collapsed state prior to fitting to a container;

FIG. 6 shows the apparatus of FIG. 2 fitted to a container prior to loading with a fluid material or particulate matter; and FIG. 7 shows the apparatus of FIG. 5 being filled with a fluid material.

Figure 1:
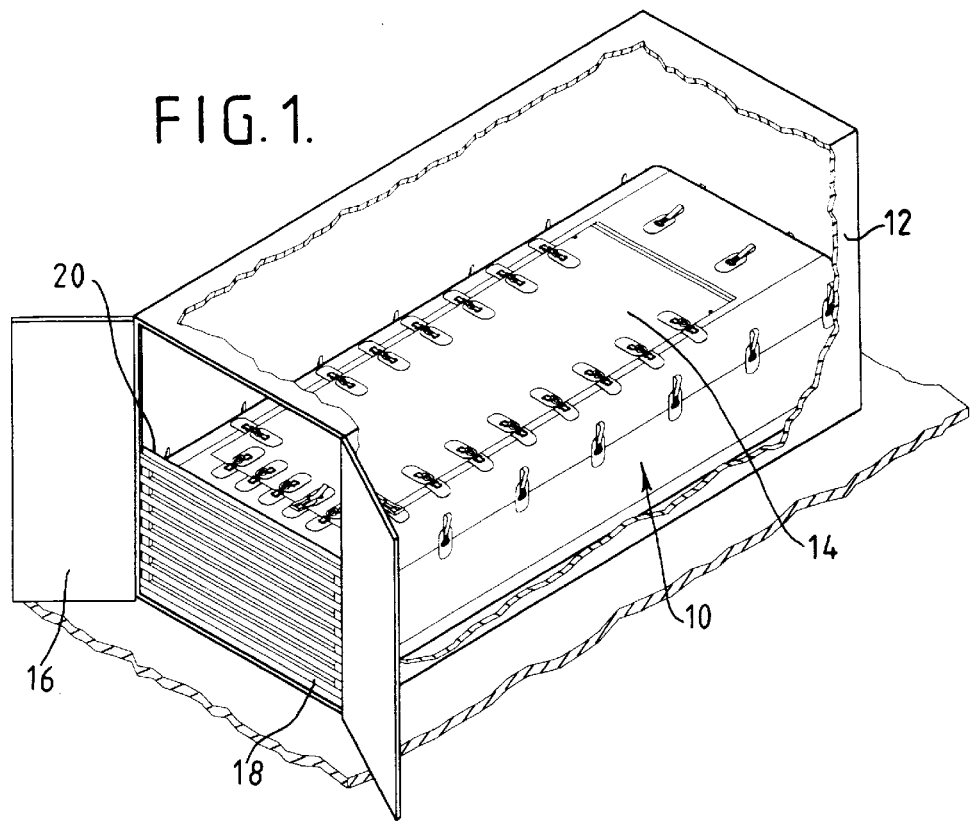
FIG. 1 is a perspective view of a prior art apparatus for use in the transportation of fluid materials in a container for use with container handling equipment.
Figure 2:
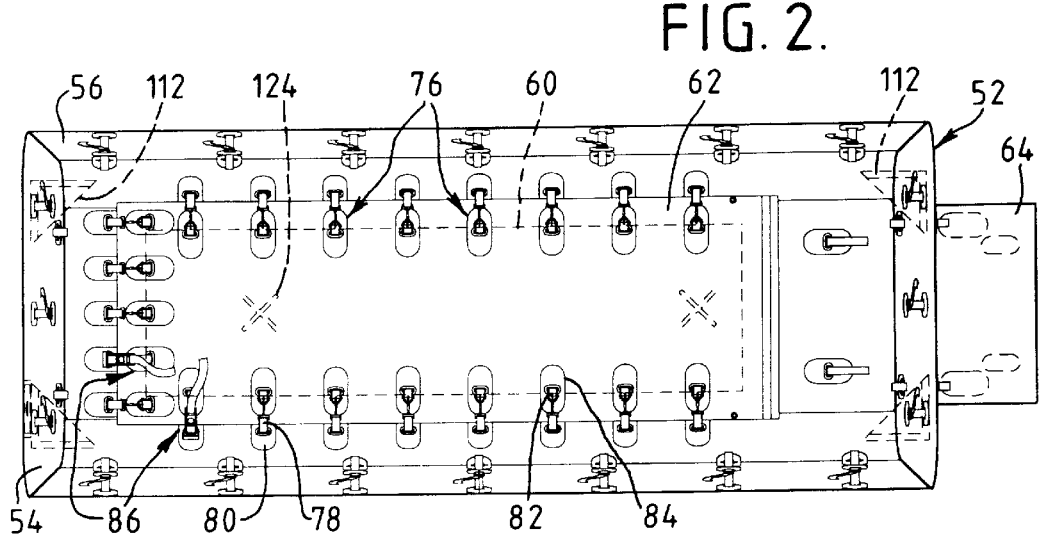
FIG. 2 is a plan view of apparatus according to the invention.

Referring to FIGS. 2 to 7, an apparatus for use in the transportation of fluid materials or particulate matter in a container, typically an ISO 20 foot container 50, for use with container handling equipment comprises a body means 52 which is removably fittable in such a container. When fitted in a container, the body means which is in the form of a bag 52 defines a volume for containing a fluid material or particulate matter.

The bag 52 is typically made of PVC and comprises a base portion and opposed end walls 54 and side walls 56 which, in use, extend upwardly and inwardly of the base portion. An upper wall 58 of the bag defines an opening 60 into the bag. A flap 62 is hingeably connected to the upper wall 58 at one end of the opening 60.

Attached to the base portion of the bag 52 are a plurality of flaps of which only one, indicated at 64, is shown. When the bag is in a collapsed state, these flaps can be folded around the bag to form a valise therefor as shown in FIG. 4.

The bag 52 is provided with adjusting means in the form of a plurality of strap means 66 (best seen in FIG. 4) which allow the volume defined by the bag to be selectively varied. Each wall 54, 56 is provided with a plurality of strap means 66 spaced apart at regular intervals along the length of the wall. The strap means 66 each comprise a first strap 66' which is secured at one end to a reinforcing patch 68 on the respective wall 54, 56 and at its other to a cam-lock 70. A cam-lock is a device well-known to persons skilled in the art and will not be described in any detail herein. The strap means 66 each comprise a second strap 66" which has one end secured to a reinforcing patch 72 on the respective wall 54, 56 and the other end 74 hanging free. Intermediate the ends thereof, the second strap 66" passes through the cam-lock 70 such that by pulling on the free end 74 the respective reinforcing patches 68, 72 can be drawn towards each other thereby reducing the upward extent of the respective wall 54, 56 for varying the volume defined by the bag 52. The straps 66" are calibrated so that an operative can readily adjust the upward extent of the walls 54, 56 to obtain a desired volume.

Securing means 76 are provided at spaced intervals around the free edges of the opening 60 for securing the flap 62 against the upper wall 58. The securing means 76 each comprise a strap 78 secured at one end to a reinforcing patch 80 on the upper wall 58 and having a hook provided with a spring-loaded gate secured to the other end. Each securing means 76 further comprises a generally triangular eye which is engageable by the respective hook and is secured to an end of a strap 82 which is secured at its other end to a reinforcing patch 84 on the flap 62.

Adjustable securing means 86 of similar construction to the securing means 76 are provided at one corner region of the flap 60/opening 62. The adjusting means 86 comprises a ratchet device instead of a hook and eye arrangement and allows the flap to be tightly drawn into a closed condition after loading of the fluid material or particulate matter.

Figure 3:
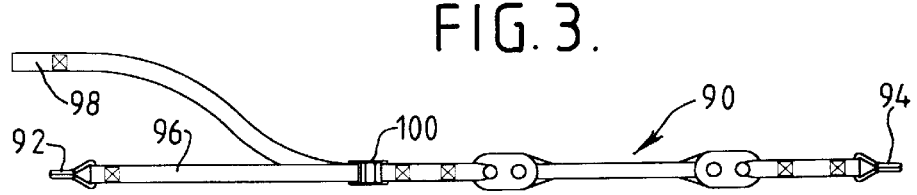
FIG. 3 shows a support strap for the apparatus of FIG. 2.

The bag 52 is also provided with support loops 88 by which the side and end walls 54, 56 can be attached to the walls of the container 50 by means of support straps 90 as best seen in FIGS. 6 and 7. As shown in FIG. 3, the support straps 90 have a hook 92, 94 at each end thereof for respectively hooking onto the support loops 88 and means provided on the container walls. A portion 96 of the support strap to which the hook 92 is secured has a free end 98 which is passed through a cam-lock 100 so that the length of the support strap can be adjusted. In use, the length of the support straps 90 is adjusted to take account of the variation in the upward extent of the walls 54, 56 when the volume of the bag 52 is adjusted and to raise the side and end walls 54, 56 from a flat condition to the use condition shown in FIGS. 6 and 7.

The apparatus further comprises a liner 102 which is fittable into the bag 52. The liner 102 is a hermetically sealed bag made of panels of a plastics material which are secured together and then welded across the ends. The material from which the liner 102 is made may vary according to the nature of the fluid material or particulate matter which is to be transported.

The liner 102 is provided with valves 104, 106 for the loading and discharge of fluid material or particulate matter. The valves 104, 106 are positioned such that when the liner 102 has been filled with material, the valve 104 is disposed adjacent the corner region of the flap 60/opening 62 provided with the adjustable securing means 84 and the valve 106 is disposed at a lower corner region of the bag 52. The valve 106 is accessed via an opening 108 in the bag which opening is partially defined by a plastics reinforcing plate 110 secured to an inner surface of the end wall 54 disposed remote from the flap hinge.

The bag 52 comprises pockets 112 on the inner surface of the base portion at each corner thereof. The pockets 112 are arranged for receiving the corners of an electric mat (not shown) for selectively applying heat to the material contained in the liner. The mat is preferably comprised of a highly flexible insulated element threaded through two sheets of a PVC backed nylon weave welded together using high frequency techniques and can be rolled up when not in use.

Use of the apparatus will now be described with particular reference to FIGS. 5 to 7. The valise containing the bag 52 in its collapsed state is placed in an empty container 50 at a predetermined distance from the closed end of the container. A face 114 of the valise is marked so that the user can orientate the valise correctly prior to unfolding the valise. With the valise unfolded, the bag is unrolled so as to lie substantially flat on the container floor.

With the bag unrolled, the support straps 90 are fitted to the support loops 88 and the user pushes the flap 62 towards the hinged end thereof so as to be able to stand on the base portion of the bag. The user then raises the side and end walls 54, 56 by means of the support straps 90. Flap support straps 120 are then attached at one end to eyes 122 provided at either side of the flap and at the other end to means provided on the container walls. This leaves the opening 60 clear for the user to move around the bag for fitting the liner 102 and adjusting the bag volume.

If the volume of the required mass of material to be transported does not correspond to the maximum volume defined by the bag 52, the volume of the bag is adjusted as necessary. Typically the bag volume is adjusted to correspond substantially to the volume occupied by 20 tonnes of the material to be transported. This is achieved by means of the strap means 66 which are used to adjust the upward extent of the side and end walls 54, 56. The user does this by pulling on the free end 74 of the lower strap 66' of each strap means 66 and can make use of the calibration marks on the lower straps to ensure that the required bag volume is substantially achieved. It will be appreciated that the support straps 90 are slackened during volume adjustment procedure and may be tightened once the desired volume is reached. Also, it will be appreciated that from a practical point of view it may be desirable to adjust the volume of the bag such that it is slightly greater than that actually required.

At this stage, if required, an electric mat is fitted in the pockets 112 on the base portion of the bag. The electrical supply leads for the mat are led out of the opening 60 at the end remote from the flap hinge.

The next stage is the fitting of the liner 102. The liner 102 selected will be made of a material suitable for use with the material to be transported and will have a maximum volume corresponding substantially to the volume occupied by the mass of the material which is to be transported. The liner is supplied in a wrapped condition and is unrolled onto the base portion of the bag 52. The inner surface of the bag is provided with side locating marks 122 and central locating marks 124 (shown in FIG. 2). By aligning the edges of the liner 102 with the side locating marks 122 and locating marks 126 on the liner above the locating marks 124 of the bag, the user can ensure that the liner is correctly positioned in the bag prior to filling with the material to be transported. It will be appreciated that the user must position the liner with the valves 104, 106 facing upwardly in the bag 52 and disposed adjacent the end wall 54 nearest the open end of the container so that the valves can be readily accessed and so that the valve 106 aligns correctly with the opening 108 in the bag end wall 54.

A flexible pipe 126 is then attached to the valve 104 for pumping the material into the liner 102. Before loading commences, the operative releases the flap support straps 120 and closes the flap 62 over the opening 60. The flap is secured to the upper wall 58 of the bag by means of the securing means 76 leaving a corner of the flap unsecured as shown in FIG. 7.

The material is then pumped into the liner 102 until the liner is filled. The flexible pipe 126 is then disconnected from the valve 104 and the corner of the flap is secured to the upper wall 58. The final securement of the flap is made by the securing means 86. The provision of the ratchet devices in the securing means 86 allows the user to firmly secure the flap against the upper wall 58 even if the liner 102 tends to bulge outwardly of the opening 60.

With the liner filled and the flap secured, the user disconnects the support straps 90 such that the bag 52 and its contents are substantially free standing in the container. At this stage, the user can take up any slack in the side and end walls 54, 56 by means of the adjustable strap means 66 so that the bag walls provide the maximum support for the load. It will be appreciated that the inward slope of the walls 54, 56 allows the user access to the strap means 66.

If an electric mat is used, the leads protruding from beneath the flap 62 can be connected to the electrical system of the lorry or ship on which the container 50 is being transported. It will be understood that high and low temperature remote sensors can be provided for an alarm system if required.

It will be understood that by providing a bag having inwardly sloping side and end walls, as opposed to the substantially vertical walls of the known bag shown in FIG. 1, the centre of gravity of the loaded bag is somewhat lower and this reduces the tendency of the bag to slide towards the container doors when, for example, the container is loaded on the sloping bed of a trailer. Furthermore, although the base portion of the bag may fully cover the container floor, there is little contact between the walls of the bag and the walls of the container. Thus dynamic forces generated in the material whilst in transit are not transmitted to the container and particularly to the container doors. It will be appreciated that such dynamic forces may cause local elastic deformation of the bag and liner and that this bulging can occur in the free space between the walls of the container and bag. Thus, it is possible to dispense with the provision of a bulkhead such as that shown in FIG. 1.

It is envisaged that the bag and liner will be used primarily for transporting fluid materials and in particular liquids. However, it is to be understood that many forms of particulate matter could also be transported in the bag. Although it is envisaged that a liner will generally be used with the bag even when the material to be transported is particulate matter, the liner may be dispensed within which case a valve for discharging material from the bag may be provided in an end wall 54 of the bag.

In the embodiment, the liner is shown provided with two valves 104, 106. The lower valve 106 allows a liquid to be drained from the liner by means of gravity. However, one valve may be omitted and the material can be pumped into and out of the liner via a single valve.

Although the adjustment of the bag is described as occurring after the raising of the side and end walls by means of the support straps 90, it is envisaged that the adjustment may alternatively take place whilst the bag is laid out on the container floor. This would provide readier access to the adjusting strap means 66 and in particular to the strap means 66 provided on the end wall 54 disposed adjacent the closed end of the container.

It will be appreciated that the apparatus shown in FIG. 1 may be provided with electrical heating means in the same way as the apparatus described with reference to FIGS. 2 to 7.

What is claimed is:

1. Apparatus for use in the transportation of fluid materials or particulate matter in a container for use with container handling equipment, said apparatus comprising body means removably fittable in such a container for defining a volume for containing a fluid material or particulate matter when fitted in such a container, said body means being provided with adjustable means for selectively varying said volume, wherein said body means comprises a base portion and opposed end walls and opposed side walls extending upwardly from said base portion, wherein said adjusting means is operable for varying the upward extent of at least said side walls, and wherein said adjusting means comprises respective adjustable strap means fitted to at least said side walls.

2. Apparatus as claimed in claim 1 wherein at least one of said opposed end and side walls extend inwardly as it extends upwardly from said base portion.

3. Apparatus as claimed in claim 1 wherein said adjusting means is operable for varying the upward extent of said end walls as well as said side walls.

4. Apparatus as claimed in claim 1, further comprising a liner fittable in said body means and having valve means for the loading and discharging of such a fluid material or such particulate matter.

5. Apparatus as claimed in claim 4 wherein said liner is adapted to contain a predetermined maximum volume of fluid material or particulate matter.

6. Apparatus as claimed in claim 4 comprising a plurality of said liners, at least one said liner being adapted to contain a predetermined maximum volume of fluid material or particulate matter different from the predetermined maximum volume of each other said liner.

7. Apparatus as claimed in claim 1 wherein said adjusting means is calibrated.

8. Apparatus as claimed in claim 1 wherein said body means is adapted for housing electrical heating means for selectively applying heat to fluid material or particulate matter contained therein.

9. Apparatus as claimed in claim 1, comprising an electrical heating mat partially received in pockets defined by said body means.

10. A method of transporting fluid material or particulate matter in a container for use with container handling equipment, the method including arranging a collapsible body means in such a container, said body means having a base portion and opposed side walls and opposed end walls for defining a volume for containing the fluid material or particulate matter to be transported, adjusting said volume of the body means to correspond substantially to the volume occupied by a predetermined mass of said fluid material or particulate matter, and loading said predetermined mass of fluid material or particulate matter into said body means, the method further comprising the step of supporting said side and end walls prior to the step of adjusting said volume by strap means removably attached to walls of said container.

11. A method as claimed in claim 10, comprising the step of fitting a liner into said body means, said liner having valve means for the loading and discharging of said fluid material or particulate matter and said fluid material or particulate matter being loaded into said liner via said valve means.

12. A method as claimed in claim 11, comprising the step of selecting a said liner which is adapted to contain a maximum volume of fluid material or particulate matter corresponding substantially to said volume occupied by said predetermined mass of material.

13. A method as claimed in claim 10, comprising the step of activating electrical heating means housed in said body means for applying heat to said fluid material or particulate matter contained therein.

\* \* \* \* \*